US009645323B2

(12) United States Patent
Gniadek et al.

(10) Patent No.: US 9,645,323 B2
(45) Date of Patent: May 9, 2017

(54) MICRO HYBRID LC DUPLEX ADAPTER

(71) Applicant: Senko Advanced Components, Inc., Marlborough, MA (US)

(72) Inventors: Jeffrey Gniadek, Northbridge, MA (US); Yuki Nishiguchi, Marlboro, MA (US)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 14/838,132

(22) Filed: Aug. 27, 2015

(65) Prior Publication Data
US 2017/0059784 A1    Mar. 2, 2017

(51) Int. Cl.
*G02B 6/38* (2006.01)
*G02B 6/42* (2006.01)

(52) U.S. Cl.
CPC ......... *G02B 6/3825* (2013.01); *G02B 6/3875* (2013.01); *G02B 6/3879* (2013.01); *G02B 6/428* (2013.01)

(58) Field of Classification Search
CPC .. G02B 6/3825; G02B 6/3875; G02B 6/3879; G02B 6/428
USPC ........... 385/53–56, 59–60, 69–72, 78, 88–89
See application file for complete search history.

(56) References Cited

U.S. PATENT DOCUMENTS

| | | | | |
|---|---|---|---|---|
| 4,167,303 A | * | 9/1979 | Bowen ................. | G02B 6/4292 385/59 |
| 5,121,454 A | * | 6/1992 | Iwano ................. | G02B 6/3807 385/56 |
| 5,537,501 A | * | 7/1996 | Iwano ................. | G02B 6/3817 385/56 |
| 5,542,015 A | * | 7/1996 | Hultermans ......... | G02B 6/3893 385/139 |
| 5,719,977 A | * | 2/1998 | Lampert .............. | G02B 6/3831 385/60 |

(Continued)

FOREIGN PATENT DOCUMENTS

WO    2009113819 A1    9/2009

OTHER PUBLICATIONS

International Search Report and Written Opinion dated Sep. 26, 2016 from corresponding International Application No. PCT/US16/48357, International Filing Date Aug. 24, 2016.

*Primary Examiner* — Ryan Lepisto
*Assistant Examiner* — Guy Anderson
(74) *Attorney, Agent, or Firm* — Pepper Hamilton LLP (57) ABSTRACT

A hybrid optical fiber adapter comprises a first adapter end configured to receive a first optical fiber connector, and a second adapter end configured to receive a second optical fiber connector of a different type from the first optical fiber connector. The hybrid adapter further comprises a spring configured to couple to the second adapter end such that the second optical fiber connector received into the second adapter end is disposed between the spring and the second adapter end, so as to allow floating of the second optical fiber connector. In one embodiment, the first optical fiber connector is an LC connector and the second optical fiber connector is a micro connector. The hybrid adapter may be coupled to a module such that the second adapter end protrudes into the module, requiring less space inside the module compared to conventional hybrid adapters, without sacrificing optical performance.

13 Claims, 7 Drawing Sheets

(56) References Cited

U.S. PATENT DOCUMENTS

| | | | | |
|---|---|---|---|---|
| 5,764,834 A * | 6/1998 | Hultermans | G02B 6/3893 | 385/139 |
| 5,802,230 A * | 9/1998 | Kuribayashi | G02B 6/4246 | 385/88 |
| 5,917,976 A * | 6/1999 | Yamaguchi | G02B 6/4249 | 385/88 |
| 6,007,256 A * | 12/1999 | Asada et al. | G02B 6/3887 | 385/59 |
| 6,085,003 A * | 7/2000 | Knight | G02B 6/3869 | 385/59 |
| 6,151,432 A * | 11/2000 | Nakajima | G02B 6/3831 | 385/55 |
| 6,196,553 B1 * | 3/2001 | Arab-Sadeghabadi | G02B 6/3816 | 174/77 R |
| 6,224,270 B1 * | 5/2001 | Nakajima | G02B 6/3831 | 385/55 |
| 6,464,408 B1 * | 10/2002 | Nolan | G02B 6/3807 | 385/56 |
| 6,533,468 B2 * | 3/2003 | Nakajima | G02B 6/3831 | 385/55 |
| 7,806,602 B2 * | 10/2010 | Deng | G02B 6/4292 | 385/88 |
| 7,901,144 B2 * | 3/2011 | Deng | H04B 10/801 | 385/88 |
| 7,901,145 B2 * | 3/2011 | Deng | G02B 6/4292 | 385/53 |
| 8,628,254 B2 * | 1/2014 | Lin | G02B 6/3825 | 385/55 |
| 8,946,934 B2 * | 2/2015 | Butts | H01R 13/6581 | 307/91 |
| 9,250,406 B2 * | 2/2016 | Chang | G02B 6/43 | |
| 9,274,295 B2 * | 3/2016 | Droesbeke | G02B 6/4201 | |
| 9,277,673 B2 * | 3/2016 | Droesbeke | G02B 6/4269 | |
| 2012/0214326 A1 * | 8/2012 | Ko | G02B 6/3817 | 439/345 |
| 2013/0084041 A1 * | 4/2013 | Lin | G02B 6/3825 | 385/56 |
| 2013/0188912 A1 * | 7/2013 | Bimboese | G02B 6/389 | 385/60 |
| 2014/0302888 A1 * | 10/2014 | Syal | H04M 1/0256 | 455/552.1 |
| 2015/0016783 A1 * | 1/2015 | Leigh | G02B 6/32 | 385/88 |

* cited by examiner

MICRO HYBRID LC DUPLEX ADAPTER

BACKGROUND

The present disclosure relates generally to optical fiber adapters or couplings for holding optical fiber connectors in alignment. More specifically, the present disclosure relates to a hybrid optical fiber adapter for coupling standard sized and micro connectors.

Fiber optics have become the standard cabling medium used by data centers to meet the growing needs for data volume, transmission speeds, and low losses. An optical fiber connector is a mechanical device disposed at an end of an optical fiber, and acts as a connector of optical paths, for example when optical fibers are joined to each other. An optical fiber connector may be coupled with an adapter to connect an optical fiber cable to other optical fiber cables or devices. An adapter generally includes a housing, or portion of a housing, having at least one port which is configured to receive and hold a connector to facilitate the optical connection of one connector to another connector or other device. For example, an LC adapter is typically configured to receive one or more standard sized LC connectors.

Figure 1A:
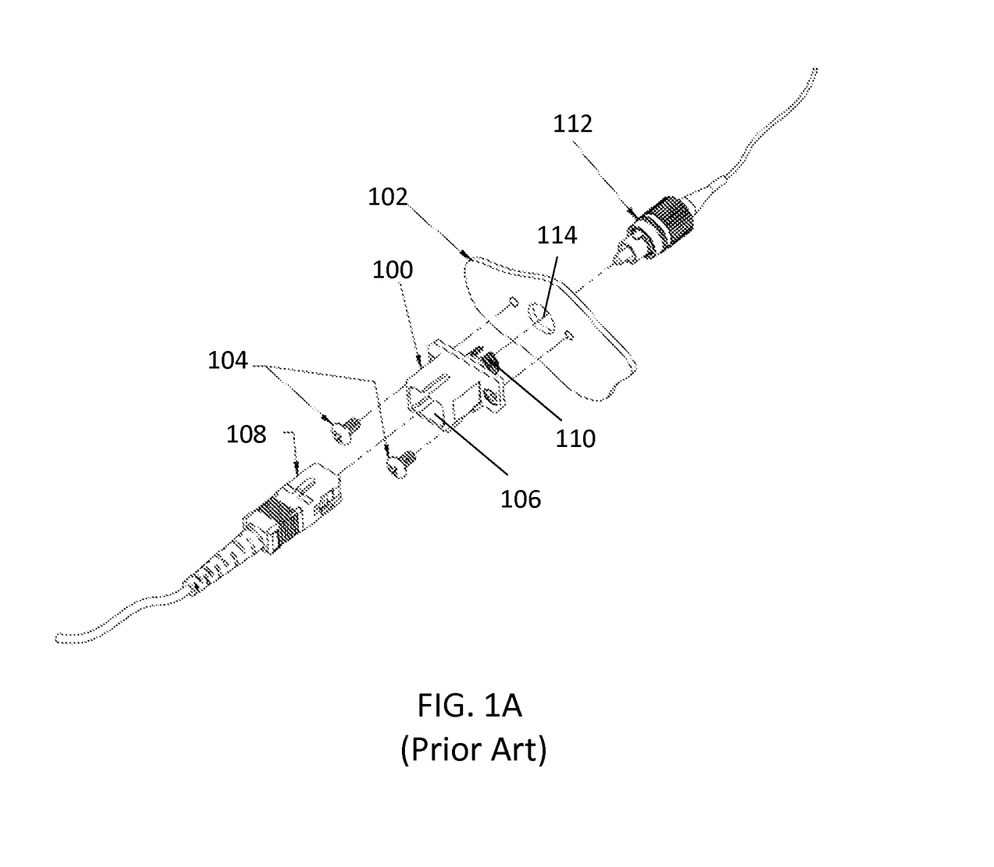
FIG. 1A is an exploded view of a prior art SC/FC hybrid adapter.
Figure 1B:
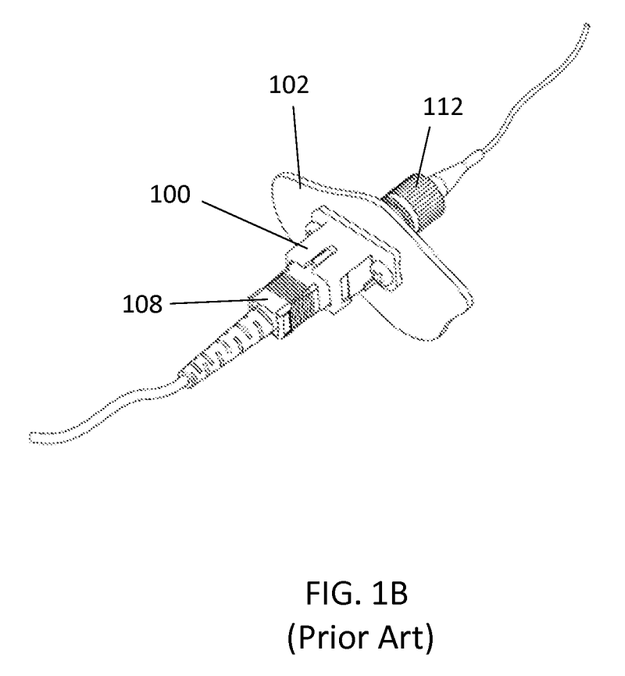
FIG. 1B is a perspective view of the assembled SC/FC hybrid adapter of FIG. 1A.

Hybrid adapters are typically designed to couple together a plurality of different types of optical fiber connectors. For example, FIG. 1A shows one example of a hybrid adapter for SC/FC type connectors. The SC/FC hybrid adapter 100 is configured to be mounted on a mounting panel 102 using mounting screws 104. The SC/FC hybrid adapter 100 a first adapter end 106 configured to receive an SC connector 108, and a second adapter end 110 configured to receive an FC connector 112. The second adapter end 110 is configured to pass through an opening 114 of the mounting panel 102, allowing each of the SC and FC connectors to be received from opposite sides of the mounting panel. FIG. 1B shows the SC/FC hybrid adapter 100 of FIG. 1A, assembled to the mounting panel 102 and coupled to each of the SC and FC connectors 108 and 112.

One disadvantage of traditional hybrid adapters as shown in FIGS. 1A and 1B is that they are bulky, taking too much space on both sides of the adapter. Specifically, they are configured to couple to full size connectors, and thus the corresponding adapter ends are bulky. This is a drawback, for example, when one end of the adapter is intended to be disposed inside a small module, as both the corresponding adapter end and the connector will occupy too much space within the module. Therefore, in lieu of coupling to two full size connectors, some hybrid adapters have been designed to accommodate coupling a standard full size optical fiber connector with a simplified optical fiber connector. A simplified optical fiber connector is merely a ferrule that may or may not have a metallic flange assembled onto the ferrule and which is used to terminate the end of an optical fiber.

For example, U.S. Pat. No. 5,719,977 titled "Optical Connector with Immovable Ferrule" discloses an adapter configured to couple to a standard size connector at one end and a simplified optical fiber connector at the other end. However, a disadvantage of such a hybrid adapter is that the simplified connector is held rigidly inside the adapter. Unlike standard size optical fiber connectors which allow the ferrule to float and also include an extension spring that is pre-loaded behind the ferrule, a simplified optical fiber connector may not include a spring behind the ferrule. Thus, the ferrule will be held rigidly inside one end of the adapter. However, for best optical performance, both ferrules in a mated pair should be floating, and subject to spring pressures that push the end faces of a pair of mated ferrules together.

Figure 2A:
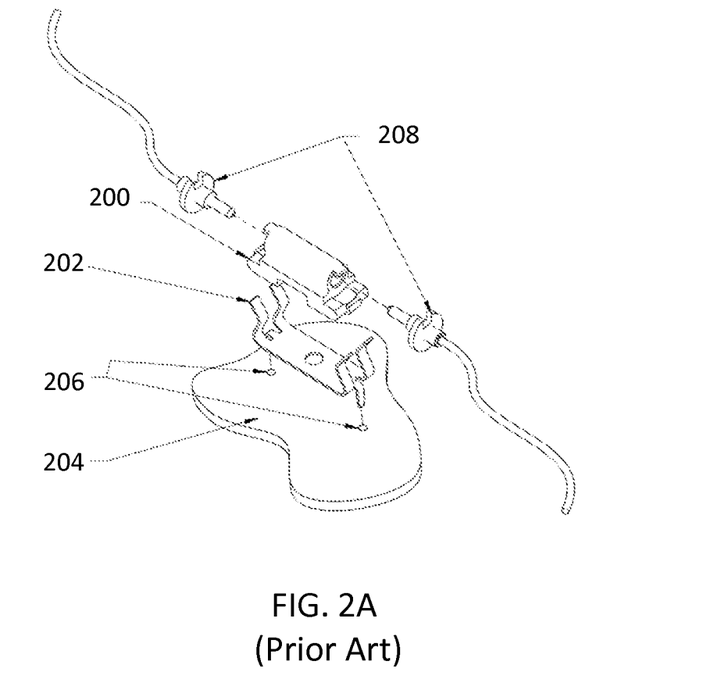
FIG. 2A is an exploded view of a prior art micro circuit board adapter.
Figure 2B:
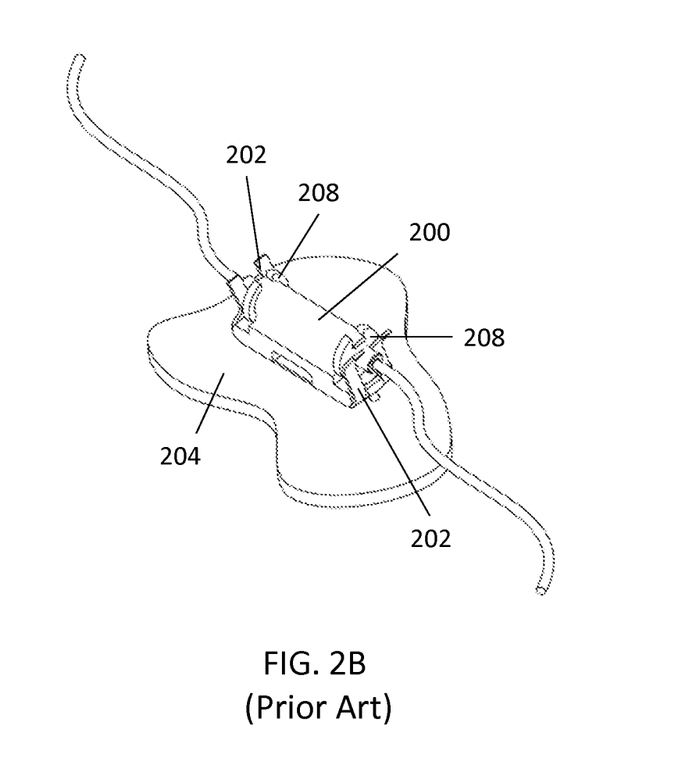
FIG. 2B is a perspective view of the assembled prior art micro circuit board adapter of FIG. 2A.

For example, FIG. 2A shows a micro circuit board adapter comprising of a ferrule alignment body 200 disposed within a ferrule spring 202. The ferrule spring 202 is mounted on a circuit board 204 via soldering holes 206. The ferrule alignment body 200 is configured to receive micro connectors 208 at each end. FIG. 2B shows the assembled adapter coupled to two micro connectors, such that each micro connector is disposed between a respective end of the ferrule alignment body 200 and a respective end of the ferrule spring 202. However, the adapter of FIGS. 2A and 2B is not a hybrid adapter and is designed for mounting directly on a circuit board rather than coupling an external optical fiber connector to a connector disposed within a module.

Accordingly, there is a need for hybrid optical fiber adapters that occupy less space within a module than conventional hybrid adapters, while enabling better optical performance by providing spring pressure and allowing the ferrules to float.

SUMMARY

Embodiments disclosed herein address the aforementioned shortcomings by providing hybrid optical fiber adapters that occupy less space within a module than conventional hybrid adapters, while enabling better optical performance. Specifically, better optical performance is achieved by spring loading the ferrules and allowing the ferrules to float. While a standard sized connector is already spring loaded within the connector, a simplified connector or a micro connector is not. Accordingly, various embodiments disclose the use of a ferrule spring coupled to the end of the adapter disposed within a module, thereby providing spring pressure and allowing even a micro connector or a simplified connector to float.

According to one aspect, there is provided a hybrid optical fiber adapter comprising a first adapter end configured to receive a first optical fiber connector, and a second adapter end configured to receive a second optical fiber connector of a different type from the first optical fiber connector, and to couple the second optical fiber connector to the first optical fiber connector. The hybrid optical fiber adapter further comprises a spring configured to couple to the second adapter end such that the second optical fiber connector received into the second adapter end is disposed between the spring and the second adapter end, so as to allow floating of the second optical fiber connector.

In some embodiments, the first optical fiber connector may be a duplex LC connector. The second optical fiber connector may comprise a plurality of micro connectors, and the second adapter end may be configured to receive the plurality of micro connectors. In various embodiments, the first optical fiber connector may be a standard optical fiber connector and the second optical fiber connector may be a simplified optical fiber connector. The second optical fiber connector may be a micro connector.

In some embodiments, the spring may be configured to allow floating of a ferrule of the second optical fiber connector during insertion of the first optical fiber connector into the first adapter end. In some embodiments, the spring may be configured to couple to the second adapter end using a clip.

In various embodiments, the first adapter end may be positioned opposite to the second adapter end. The hybrid optical fiber adapter may be configured to couple to a module such that the second adapter end protrudes inside the module. In some embodiments, a length of the second adapter end protruding inside the module may be less than about 5.5 mm. In various embodiments, the spring may be configured to couple to a portion of the second adapter end protruding inside the module. A total length of the second adapter end and the spring inside the module may be less than about 7 mm. In some embodiments, the module may comprise a circuit board. In some embodiments, the hybrid optical fiber adapter may be configured to couple to the module using at least one screw.

The foregoing, as well as additional objects, features and advantages of the present disclosure will be more apparent from the following detailed description, which proceeds with reference to the accompanying drawings.

DETAILED DESCRIPTION

As used herein, the term "optical fiber" is intended to apply to all types of single mode and multi-mode light waveguides, including one or more bare optical fibers, coated optical fibers, loose-tube optical fibers, tight-buffered optical fibers, ribbonized optical fibers, bend performance optical fibers, bend insensitive optical fibers, nanostructured optical fibers or any other expedient for transmitting light signals. The term optical fiber cable may further include multi-fiber optic cables having a plurality of the optical fibers.

For connection of cables together or with other optical fiber devices, the terminal ends of a cable may include a connector. A connector may include a housing structure configured to interact with and connect with an adapter. An adapter, in a simple form, may include two aligned ports for aligning optical fiber connectors therein to align and connect optical fibers end-to-end. Hybrid adapters are configured to couple different types of optical fiber connectors.

Various embodiments disclosed herein provide hybrid adapters that use minimum space on one end of the hybrid adapter that is configured to be disposed within a module and configured to receive a micro optical fiber connector or a simplified optical fiber connector. This is a desirable feature for modules or devices having very little space inside the module, and further presents little or no obstacle inside the module that might interrupt an otherwise optimum flow of air that is needed to cool electronic circuitry within the module. By contrast, the prior art hybrid adapter shown in FIGS. 1A and 1B has bulky ends, both of which are configured to receive standard sized connectors. Various embodiments disclosed herein require less space within a module without sacrificing optical performance by supporting the ferrule with a spring and allowing it to float.

Figure 3:
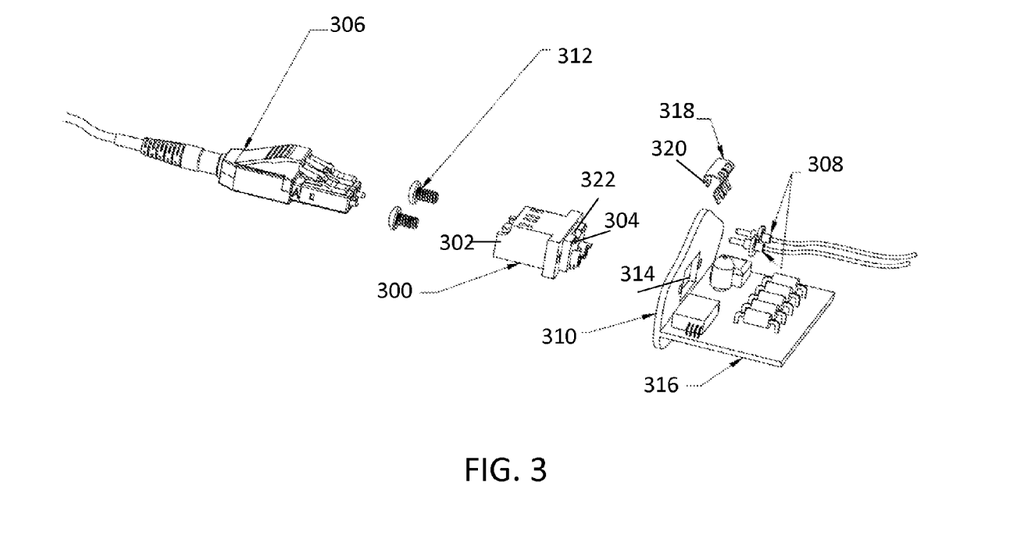
FIG. 3 is an exploded view of one embodiment of a hybrid adapter according to aspects of the present disclosure.

FIG. 3 shows one embodiment of a hybrid adapter 300 having a first adapter end 302 and a second adapter end 304. The first adapter end 302 of the hybrid adapter 300 is configured to receive a standard duplex LC connector 306. The second adapter end 304 of the hybrid adapter 300 is configured to receive micro connectors 308. The second adapter end 304 includes ferrule passages 305 for receiving the ferrules of the micro connectors 308. Further, the hybrid adapter 300 is configured for coupling to a module panel 310, for example using adapter mounting screws 312. The module panel 310 has an opening 314 for receiving the second adapter end 304. The second adapter end 304 is configured to occupy a small space on the inside of the module when the hybrid adapter 300 is coupled to the module panel 310. The module panel 310 is attached to a module circuit board 316 having various components thereon. Thus, it is important for the hybrid adapter 300 to occupy minimal space within the module, for example to avoid interference with any components disposed on the module circuit board 316.

In addition to conserving space within the module, the hybrid adapter 300 is configured to allow good optical performance by including a spring 318 for supporting the micro connectors 308. The spring 318 is configured to couple to the second adapter end 304. For example, the spring 318 is a clip on micro connector spring. The spring 318 includes a tab 320 and the second adapter end 304 includes a slot 322. The slot 322 is configured to receive the tab 320 of the spring 318. The disclosure is not limited to clip on attachments and in other embodiments, the spring may be coupled to the adapter using an alternative mechanism. The spring 318 allows a simplified optical fiber connector which does not have a spring, or a micro connector, which also does not have a spring, to be spring loaded. The spring 318 need not be coupled to the first adapter end 302, since the first adapter end is configured to receive a standard connector which includes a ferrule spring.

Figure 4:
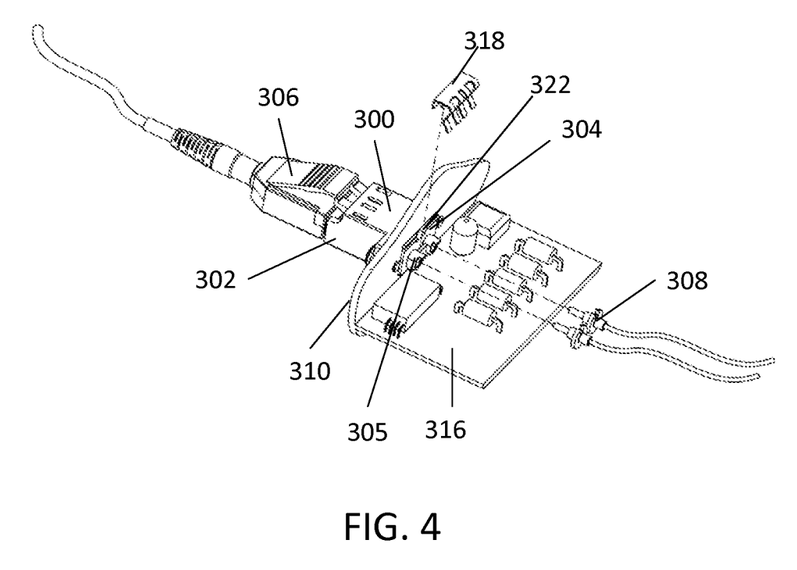
FIG. 4 is a perspective view of the partially assembled hybrid adapter of FIG. 3 according to aspects of the present disclosure.

FIG. 4 shows a partially assembled perspective view of the hybrid adapter 300. The hybrid adapter is coupled to the duplex LC connector 306 at the second adapter end 302, and is also shown coupled to the module panel 310 such that the second adapter end 304 protrudes into the module. For example, the length of the second adapter end that protrudes into the module may be less than about 5.5 mm. By contrast, a conventional adapter may have a protruding portion having a length of about 14 mm. The horizontal dashed lines show that the micro connectors 308 will be inserted into respective ferrule passages 305 of the second adapter end 304. The vertical dashed line shows that the spring 318 will be clipped onto the slot 322 of the second adapter end 304.

Figure 5:
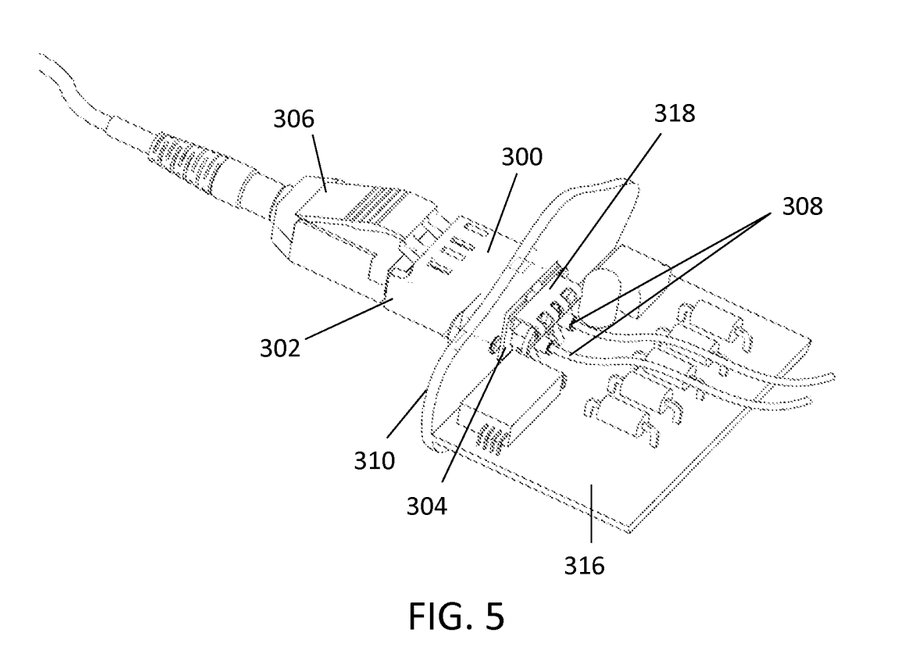
FIG. 5 is a perspective view of the assembled hybrid adapter of FIG. 3 according to aspects of the present disclosure.

FIG. 5 is a perspective view of the assembled hybrid adapter 300 that is further coupled to the micro connectors 308. The spring 318 is then clipped onto the second adapter end 304, such that the micro connectors 308 are disposed between the second adapter end and the spring. This provides support to the micro connectors and allows them to float as the duplex LC connector 306 is pushed into the first adapter end 302. Further, as shown, the portion of the adapter 300 that protrudes into the module is compact. For example, in one embodiment, a length of the portion of the adapter protruding into the module and including the clip on spring of the adapter is less than about 7 mm.

Various embodiments of hybrid adapters disclosed herein may also be configured for use with other simplified connectors rather than micro connectors on one side. Also, in lieu of duplex LC adapters, embodiments may be configured for use with other standard size adapters, such as single LC adapters, on the opposite side.

One advantage of embodiments of adapters provided herein is reduction of the adapter size on the side that protrudes inside a module. Another advantage is inclusion of a ferrule spring to allow ferrule motions without the need for a full sized connector on the adapter side that protrudes inside a module. Specifically, embodiments provide an LC adapter having a smaller size inside a module, and providing a spring loaded motion for the optical fiber ferrule inside the module when the adapter is mated externally with a conventional LC connector. Thus, various embodiments require less space inside a module, as compared to conventional adapters, without sacrificing optical performance.

Various parts, components or configurations described with respect to any one embodiment above may also be adapted to any others of the embodiments provided.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A hybrid optical fiber adapter comprising:
   a first adapter end configured to receive a first optical fiber connector;
   a second adapter end configured to receive a second optical fiber connector of a different type from the first optical fiber connector, and to couple the second optical fiber connector to the first optical fiber connector, the hybrid optical fiber adapter being configured to couple to a module such that the first adapter end is disposed externally to the module and the second adapter end protrudes inside the module; and
   a spring configured to couple to the second adapter end after the second optical fiber connector is received into the second adapter end, such that the second optical fiber connector is disposed between the spring and the second adapter end, so as to allow floating of the second optical fiber connector.

2. The hybrid optical fiber adapter of claim 1, wherein the first optical fiber connector is a duplex LC connector.

3. The hybrid optical fiber adapter of claim 1, wherein the second optical fiber connector comprises a plurality of micro connectors, the second adapter end being configured to receive the plurality of micro connectors.

4. The hybrid optical fiber adapter of claim 1, wherein the first optical fiber connector is a standard optical fiber connector and the second optical fiber connector is a simplified optical fiber connector.

5. The hybrid optical fiber adapter of claim 1, wherein the second optical fiber connector is a micro connector.

6. The hybrid optical fiber adapter of claim 1, wherein the spring is configured to allow floating of a ferrule of the second optical fiber connector during insertion of the first optical fiber connector into the first adapter end.

7. The hybrid optical fiber adapter of claim 1, wherein the spring is configured to couple to the second adapter end using a clip.

8. The hybrid optical fiber adapter of claim 1, wherein the first adapter end is positioned opposite to the second adapter end.

9. The hybrid optical fiber adapter of claim 1, wherein a length of the second adapter end protruding inside the module is less than about 5.5 mm.

10. The hybrid optical fiber adapter of claim 1, wherein the spring is configured to couple to a portion of the second adapter end protruding inside the module.

11. The hybrid optical fiber adapter of claim 10, wherein a total length of the second adapter end and the spring inside the module is less than about 7 mm.

12. The hybrid optical fiber adapter of claim 1, wherein the module comprises a circuit board.

13. The hybrid optical fiber adapter of claim 1, being configured to couple to the module using at least one screw.

* * * * *